United States Patent
De

(10) Patent No.: US 10,216,419 B2
(45) Date of Patent: Feb. 26, 2019

(54) DIRECT INTERFACE BETWEEN GRAPHICS PROCESSING UNIT AND DATA STORAGE UNIT

(71) Applicant: HGST Netherlands B.V., Amsterdam (NL)

(72) Inventor: Arup De, Milpitas, CA (US)

(73) Assignee: HGST Netherlands B.V., Amsterdam (NL)

( * ) Notice: Subject to any disclaimer, the term of this patent is extended or adjusted under 35 U.S.C. 154(b) by 249 days.

(21) Appl. No.: 14/993,531

(22) Filed: Jan. 12, 2016

(65) Prior Publication Data

US 2017/0147516 A1 May 25, 2017

Related U.S. Application Data

(60) Provisional application No. 62/257,510, filed on Nov. 19, 2015.

(51) Int. Cl.
| | |
|---|---|
| *G06F 13/16* | (2006.01) |
| *G06F 3/06* | (2006.01) |
| *G06F 13/28* | (2006.01) |
| *G06F 13/42* | (2006.01) |

(52) U.S. Cl.
CPC ............ *G06F 3/061* (2013.01); *G06F 3/0656* (2013.01); *G06F 3/0685* (2013.01); *G06F 13/1673* (2013.01); *G06F 13/28* (2013.01); *G06F 13/4234* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 8,335,896 B1 | 12/2012 | Smith | |
| 8,868,867 B2 | 10/2014 | Swanson et al. | |
| 9,116,623 B2 | 8/2015 | Ashok et al. | |
| 2006/0031603 A1 | 2/2006 | Bradfield et al. | |
| 2008/0055322 A1 | 3/2008 | Ryan et al. | |
| 2009/0150894 A1 | 6/2009 | Huang et al. | |
| 2011/0154061 A1* | 6/2011 | Chilukuri | G06F 12/1408 713/193 |

(Continued)

OTHER PUBLICATIONS

Mueller et al., WoW: What the World of (Data) Warehousing Can Learn from the World of Warcraft, SIGMOD'13, Jun. 22-27, 2013, pp. 961-964 (4 pages).

(Continued)

*Primary Examiner* — Cheng Yuan Tseng

(74) *Attorney, Agent, or Firm* — Patterson & Sheridan, LLP; Steven Versteeg

(57) ABSTRACT

A system is described that includes a data bus communicatively coupled to a host processor, a graphics processing unit (GPU), and a data storage unit. The GPU is configured to receive instructions from the host processor to perform direct communication over the data bus with the data storage unit. Responsive to receiving instructions to communicate directly with the data storage unit, the GPU will initiate a direct communication channel over the data bus. Once established, a direct communications channel allows the data storage unit and the GPU to directly exchange information and bypass the host CPU and system memory.

13 Claims, 4 Drawing Sheets

(56) References Cited

U.S. PATENT DOCUMENTS

| | | |
|---|---|---|
| 2011/0292058 A1* | 12/2011 | Herr .................... G06T 1/60 345/520 |
| 2013/0024595 A1 | 1/2013 | Subramaniyan et al. |
| 2013/0086315 A1* | 4/2013 | Kim .................... G06F 13/28 711/105 |
| 2013/0132643 A1 | 5/2013 | Huang |
| 2014/0129753 A1* | 5/2014 | Schuette ............. G06F 13/4068 710/301 |
| 2014/0281106 A1 | 9/2014 | Saghi et al. |
| 2014/0281171 A1 | 9/2014 | Canepa |
| 2015/0081956 A1 | 3/2015 | Vucinic et al. |
| 2015/0106560 A1 | 4/2015 | Perego et al. |

OTHER PUBLICATIONS

Akel, "Onyx: A Phase-Change Memory Storage Array", 2011, Retrieved from http://cseweb.ucsd.edu/~swanson/papers/OnyxThesis.pdf, 42 pgs. Applicant points out, in accordance with MPEP 609.04(a), that the year of publication, 2011, is sufficiently earlier than the effective U.S. filing date, Jan. 12, 2016, so that the particular month of publication is not in issue.

Seshadri, "Software Defined SSD: An Architecture to Generalize Date Processing in SSDs", 2013, Retrieved from http://escholarship.org/uc/item/0rh5q183#page-1, 44 pgs. Applicant points out, in accordance with MPEP 609.04(a), that the year of publication, 2013, is sufficiently earlier than the effective U.S. filing date, Jan. 12, 2016, so that the particular month of publication is not in issue.

U.S. Appl. No. 15/355,851, filed Nov. 18, 2016, by Arup De.

\* cited by examiner

DIRECT INTERFACE BETWEEN GRAPHICS PROCESSING UNIT AND DATA STORAGE UNIT

This application claims the benefit of U.S. Provisional Application No. 62/257,510 filed Nov. 19, 2015, the entire content of which is hereby incorporated by reference.

TECHNICAL FIELD

The disclosure generally relates to computer systems that perform general-purpose computing on graphics processing units (GPGPU).

BACKGROUND

A computing system may perform a technique called general-purpose computing on graphics processing units (GPGPU) by performing some tasks, which would otherwise be performed by a host processor of the computing system, using an available, high-performance graphics processing unit (GPU) of the computing system. Through GPGPU, a computing system may realize significant performance gains as GPGPU may enable the computing system to perform parallel processing of large-scale, computationally-intensive applications.

Despite the benefits GPGPU provides when performing computationally-intensive tasks, some computing systems that use GPGPU techniques may suffer a lag in performance when interacting with a data storage unit, such as a hard disk drive (HDD), a solid state drive (SDD), or other storage-medium. The host processor of a typical GPGPU computing system typically manages all information flow both to and from data storage units, therefore, a GPU may take more time to complete an operation (e.g., read or write) that involves an information exchange between the GPU and the data storage unit than a purely computational operation that does not require involvement with the data storage unit. In addition, a reliance on the host processor to manage all information exchanges with the data storage unit may prevent a system from benefiting from the advantages that true parallel-processing through GPGPU otherwise provides.

SUMMARY

In one example, the disclosure is directed to a method comprising receiving, by a graphics processing unit (GPU) of a computing system, from a host processor of the computing system, first information instructing the GPU to perform direct communication with a data storage unit of the computing system. Responsive to receiving the first information, initiating, by the GPU, a direct communication channel with the data storage unit for exchanging data stored at the data storage unit. Finally, executing by the GPU, one or more operations that rely on the direct communication channel to exchange second information with the data storage unit. In another example, the disclosure is directed to a method comprising receiving, by a solid state drive (SSD) of a computing system, from a host processor of a computing system, first information for instructing the SSD to perform direct communication with a graphics processing unit (GPU) of the computing system. Based on the first information, initiating, by the SSD, a direct communication channel with the GPU and exchanging second information with the GPU using the direct communication channel.

In another example, the disclosure is directed to a computing system, comprising: a data bus; a host processor communicatively coupled to the data bus; a graphics processing unit (GPU) communicatively coupled to the data bus; and a data storage unit communicatively coupled to the data bus. The data storage unit is configured to store data. The GPU is configured to receive, via the data bus, from the host processor, first information instructing the GPU to perform direct communication, over the data bus, with the data storage unit. Responsive to receiving the first information, the GPU may initiate a direct communication channel, over the data bus, with the data storage unit for exchanging portions of the data stored at the data storage unit. The GPU may execute one or more operations that rely on the direct communication channel to exchange second information with the data storage unit.

The details of one or more examples of the disclosure are set forth in the accompanying drawings and the description below. Other features, objects, and advantages of the disclosure will be apparent from the description and drawings, and from the claims.

DETAILED DESCRIPTION

The techniques of this disclosure may enable direct communication between a graphics processing unit (GPU) of a general-purpose computing on graphics processing units (GPGPU) system and a data storage unit of the GPGPU system without involving the host processor or the system memory of the GPGPU system. To enable direct communication between the GPU and the data storage unit, the host may instruct the GPU to initiate a direct communication channel by allocating a portion of the GPU memory to be used as a data buffer for exchanging information with the data storage unit. The host may provide the data storage unit with the location of the data buffer in the GPU memory. A direct memory access (DMA) controller of the data storage unit may save the location of the data buffer of the GPU for future information exchanges with the GPU. The GPU may read and write information to the data buffer, as if the GPU was reading and writing directly to the data storage unit and the data storage unit may automatically recognizes when the GPU reads or writes to the data buffer, and in response, perform a corresponding operation on its stored data. The techniques of this disclosure may enable direct communication between a graphics processing unit (GPU) of a general-purpose computing on graphics processing units (GPGPU) system and a data storage unit of the GPGPU system without involving the host processor of the GPGPU system.

Figure 1:
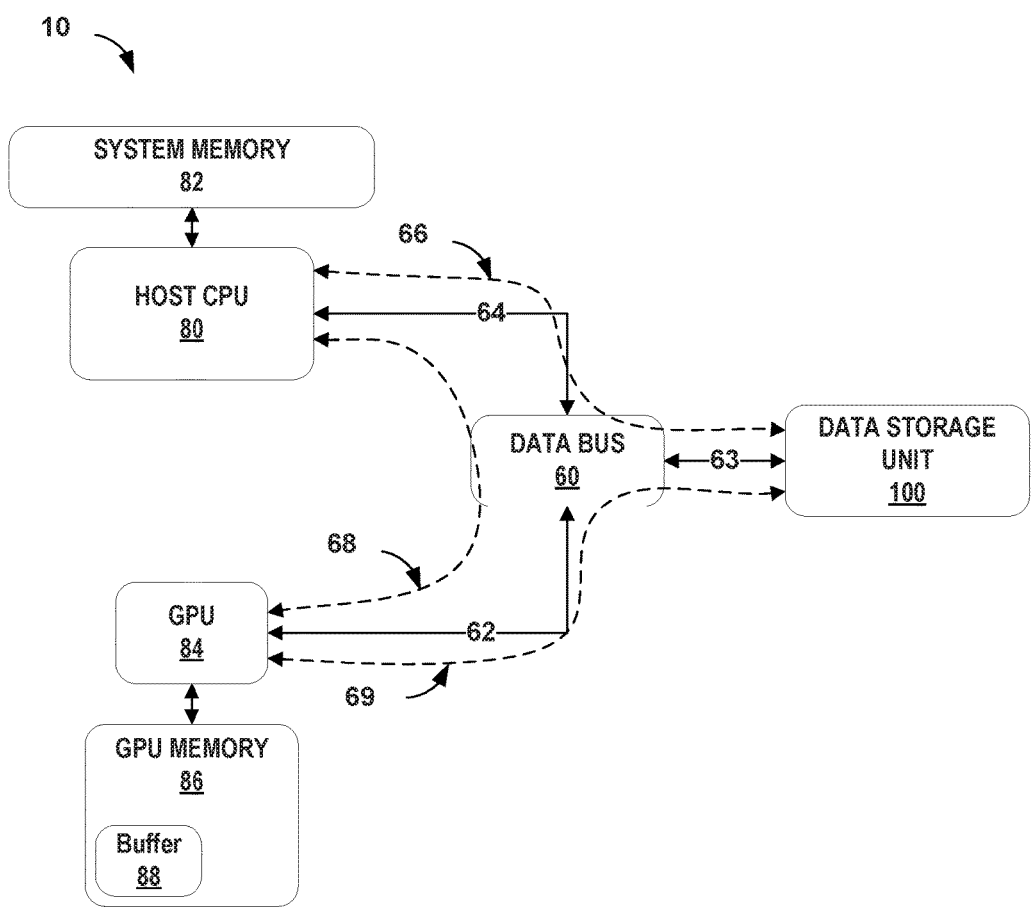
FIG. 1 is a conceptual diagram of an example general-purpose processing on graphics processing units (GPU) type computing system that includes an example graphics processing unit (GPU) configured to directly communicate with an example data storage unit, in accordance with techniques of this disclosure.

FIG. 1 is a conceptual diagram of an example general-purpose processing on graphics processing units (GPGPU)

type computing system 10 that includes an example graphics processing unit (GPU) 84 configured to directly communicate with an example data storage unit 100 that are, in accordance with techniques of this disclosure. Computing system 10 includes host CPU 80, GPU 84 and data storage unit 100 each communicatively coupled to data bus 60. Data bus 60 provides a plurality of communication paths for transferring information between the various components of system 10 to perform operations and tasks. Data bus 60 may include hardware, software, firmware (in any combination) to manage information as the information flows between the components of computing system 10. Data bus 60 may control the timing of when an information packet (e.g., data) travels along the communication path to prevent collisions between information packets. The term "data" may be used throughout this disclosure as shorthand for any information exchanged between computing devices or sub-components (e.g., a GPU and a CPU). Data bus 60 may be PCIe (PCI Express (Peripheral Component Interconnect Express), PCI, PCI-eXtended (PCI-X), accelerated graphics port (AGP) or other type of data bus.

Host CPU 80 represents one or more processors, computing devices, or computing systems that may be configured to perform operations on behalf of computing system 10.

Host CPU 80 may exchange information with GPU 84 and data storage unit 100 to perform various operations on behalf of system 10. For example, host CPU 80 may retrieve and execute instructions stored by data storage unit 100 for controlling various features or services provided by system 10. For example, host CPU 10 may send, via data bus 60, write and read commands to data storage unit 100 that cause data storage unit 100 to record or retrieve data. Host CPU 80 may improve performance of system 10 by performing GPGPU techniques and offloading some operations for performance by GPU 84.

Host CPU 80 may be a microprocessor, a microcontroller, system on a chip (SoC), muti-core processor, an array of processors that operate in parallel or other arrangement that may contain an arithmetic logic unit (ALU), memory, interfaces, one or more control units, and other subcomponents. The functions of host CPU 80 may be implemented using a combination of hardware, software, and firmware.

System memory 82 may be integrated into host CPU 80, or be one or more external components. System memory 82 may be may be random access memory (RAM), dynamic RAM (DRAM), other forms of DRAM such as synchronous DRAM (SDRAM), double data rate SDRAM (e.g. DDR1 SDRAM, DDR2 SDRAM etc.) and similar types of computer memory. System memory 82 may be implemented as one or more external memory modules connected as a bank of memory and accessible by host CPU 80 using the memory bus, or by GPU 84, or other system components using the data bus. System Memory 82 may be configured as single in-line memory modules (SIMM), dual in-line memory modules (DIMM), Rambus in-line memory modules (RIMM) or other interconnection configurations. Host CPU 80 may store information at system memory 82 for use in performing operations on behalf of system 10. For example, CPU 80 may read information stored by data storage unit 100 into system memory 82 for performing an operation. In some examples, after performing an operation using the information retrieved from data storage unit 100 and stored at system memory 82, CPU 80 may write the information from system memory 82 back to data storage unit 100. In some examples, CPU 80 may perform subsequent operations using the information stored at system memory 82.

As CPU 80 performs read and write operations with data storage unit 100, data bus 60 may manage the information being exchanged between CPU 80 and data storage unit 100. For example, data bus 60 may cause the information to flow along data path 66 of data bus 60 through data connections 63 and 64.

Graphics processing unit (GPU) 84 may be one or more of any specialized processors, chips, or other components designed for rendering graphics, images, animations, and video for output to a display device (not shown in FIG. 1). For example, rather than utilize host CPU 80 for rendering graphical information for display, system 10 includes GPU 84 for rendering graphical information to free-up host CPU 80 to perform other operations in-parallel with the rendering by GPU84, that may be related to, or independent of, the rendering.

GPU 84 may be capable of performing parallel operations on multiple sets of data to simultaneously render multiple images for simultaneous display. Because GPU 84 may be capable of performing parallel operations on multiple sets of data, computing system 10 may also utilize GPU 84 to perform other tasks on behalf of system 10, when GPU 84 is not rendering data. For example, system 10 may cause GPU 84 to act as a vector processor for executing operations that may be unrelated to graphics processing, but may require complex and/or repetitive computations.

In some examples, GPU 84 may be located on a plug-in card (e.g., a video card), in a chipset on a motherboard or on the same chip as host CPU 80. Some examples of functions that the GPU may execute the large-scale data applications such as: offer matching techniques (e.g., as performed in online shopping systems), bioinformatics, scientific computing, data analytics (e.g., as performed in large database systems), and deep learning techniques (e.g., as performed in neural networks and other machine learning and artificial intelligence systems). Other functions may include matrix manipulation, matrix vector multiplication and system modeling.

In a manner similar to the host CPU 80 and system memory 82, GPU 84 may use GPU memory 86 to store information for GPU 84 to perform one or more operations as well as to store results from the one or more operations. As one example, GPU 84 may need to perform an operation on a graphics item (e.g. video or photo) using information that host CPU 80 may transfer from system memory 82 to GPU memory 86. CPU 80 may transfer the information to GPU memory 86 using data path 68 of data bus 60 through data connections 64 and 62. GPU memory 86 may be RAM, video random access memory (VRAM), dual port type of dynamic RAM (DRAM), SDRAM, Rambus dynamic random access memory (RDRAM), synchronous graphics RAM (SGRAM), graphics double data rate memory (e.g. GDDR, GDDR2, GDDR3, etc.) and similar types of computer memory. GPU memory 86 may be internal to the GPU component (e.g. on board the GPU chip). As with system memory 82, GPU memory 86 may also be one or more external memory modules connected as a bank of memory and accessible by GPU 84 and may be configured as single in-line memory modules (SIMM), dual in-line memory modules (DIMM), Rambus in-line memory modules (RIMM) or other interconnection configurations.

In accordance with the techniques described herein, and as shown in FIG. 1, GPU 84 may allocate a portion of GPU memory 86 as a communications buffer 88 (referred to simply as "buffer 88") to be used when directly communicating with data storage unit 100. In other words, buffer 88 may be part of a direct communication channel with data storage unit 100. For example, as described in detail below, GPU 84 may transfer an indication of the memory location of the data buffer 88 to host CPU 80, and CPU 80 may in turn transfer this indication of the memory location of buffer 88 to data storage unit 100. Then, as a way for GPU 84 to send information to data storage unit 100, GPU 84 may write information to buffer 88 and in response, data storage unit 100 may read the information from buffer 88. As a way for GPU 84 to receive information from data storage unit 100, data storage unit 100 may write information to buffer 88, and in response, GPU 84 may read the information from buffer 88.

In some examples, buffer 88 may not be large enough for a portion of data from data storage unit 100. In this example, data storage unit 100, data bus 60, or some other component of computing system 10 may break the portion of data into a plurality of smaller portions. Data storage unit 100, or some other component, may send each smaller portion to data buffer 88. GPU 84 may read each portion from data buffer 88, transfer the data to another location in GPU memory 86 and reassemble the smaller portions back into a larger portion of data. Similarly, GPU 84 may execute one or more operations resulting in a large portion of data to be written to data storage unit 100. GPU 84 may write this large portion to buffer 88 in a plurality of smaller portions. In turn, data storage 100 may write each smaller portion to the addressable memory of data storage unit 100. In this way, GPU 84 may execute one or more operations that rely on the direct communication channel to exchange information directly with data storage unit 100. The direct communication channel data includes buffer 88 within GPU memory 86 as a dedicated data path between GPU 84 and the data storage unit 100 that bypasses the host CPU 80 and system memory 82. The direct communication data channel may reduce software overhead, which may include overhead from the operating system, context switches, kernel device driver and shared input/output (I/O) resources.

Data storage unit 100 is a computer-readable storage medium configured to store data and is communicatively coupled to the data bus 60. Data storage unit 100 may be a non-transitory computer-readable storage medium and may consist of hard disk drive (HDD) technology, solid stated drive (SSD), a hybrid of HDD and SSD or some other memory storage media. Data storage unit 100 may include one or more internal processors, such as a synergistic processor unit (SPU) that may perform tasks, including, but not limited to, scatter-gather computation operations to fetch and store data, encryption and decryption operations, direct memory access (DMA) operations and other storage services such as caching, transactions and permissions management.

Data storage unit 100 may communicate directly with host CPU 80 via data path 66 of data bus 60 so that CPU 80 can perform operations on the data stored at data storage unit 100. For example, as part of a read operation performed by CPU 80, data storage unit 100 may respond to a request for data from CPU 80 by locating the data from within data storage unit 100 and transferring the data from data storage unit 100, via data path 66 of data bus 60, to system memory 82. Similarly, as part of a write operation, data storage unit 100 may respond to a request by host CPU 80 to store a portion of data from system memory 82 by transferring the portion of data from system memory 82, via path 66 of data bus 60, to be stored within data storage unit 100.

In accordance with techniques of this disclosure, data storage unit 100 may bypass host CPU 80 altogether and communicate directly with GPU 84, via data path 69 of data bus 60 so that GPU 84 can perform operations on the data stored at data storage unit 100. Data storage unit 100 may receive, via data path 66 of data bus 60, information from host CPU 80 containing instructions to initiate a direct communication channel with GPU 84 along with an indication of a memory location of buffer 88. Then, if GPU 84 requests, via buffer 88, data from data storage unit 100 as part of a read operation, data storage unit 100 may retrieve the data and write the data directly to buffer 88. Conversely, if GPU 84 transfers information to be stored by data storage unit 100 as part of a write operation, data storage unit 100 may receive the data directly from buffer 88 and write the data to its internal storage. In reading or writing information from or to buffer 88, the information may travel between data storage unit 100 and GPU 84 using data path 69 of data bus 60.

GPU 84 of computing system 10 may communicate directly with data storage unit 100 without involving host CPU 80 of computing system 10. During initialization, host CPU 80 may provide data storage unit 100 with the location of data buffer 88 in GPU memory 86. GPU 84 may read and write information to data buffer 88, as if the GPU was reading and writing directly to data storage unit 100. As an example, when GPU 84 writes to data buffer 88, this may provide an indication to data storage unit 100 that there is data available for transfer to data storage unit 100. Data storage unit 100 may automatically recognize when GPU 84 writes to data buffer 88, and in response, perform a corresponding operation on its stored data.

Accordingly, the techniques and circuits described herein may enable direct communication between a GPU and a data storage unit of an example GPGPU computing system. As such, the techniques and circuits may improve performance over other GPGPU computing systems that require a host CPU to handle all information transfers with a data storage unit. In the example of a data storage unit that is an SSD, this direct communication may be called a GPU-SSD direct interface (GSDI). Even though other computing systems may have a DMA engine that allows a data storage unit to transfer data directly to a system memory of a host CPU, these other systems provide no way, other than through management by the host CPU, to transfer information between the data storage unit and the GPU. The example GPGPU computing systems described herein may transfer data directly between a buffer of a GPU memory and a data storage unit, without involving the host or the system memory, thereby improving performance and reducing time lag. For example, directly transferring data from the data storage unit to the buffer allocated in the GPU memory eliminates multiple copies of data from the data storage unit, to the system memory and a second transfer to the GPU memory.

Through bypassing the host CPU, an example GPGPU computing system may make a host CPU available to perform other functions on behalf of the computing system. The GPU of an example GPGPU computing system can also execute additional types of applications or threads as part of GPGPU techniques that were otherwise performed by the host CPU. That is, the GPU and the example GPGPU computing system may, in accordance with the described techniques, and as part of GPGPU techniques, execute applications and threads that rely on access to information stored at the data storage unit. Improved host CPU and GPU utilization may improve energy efficiency of the example GPGPU computing system.

Figure 2:
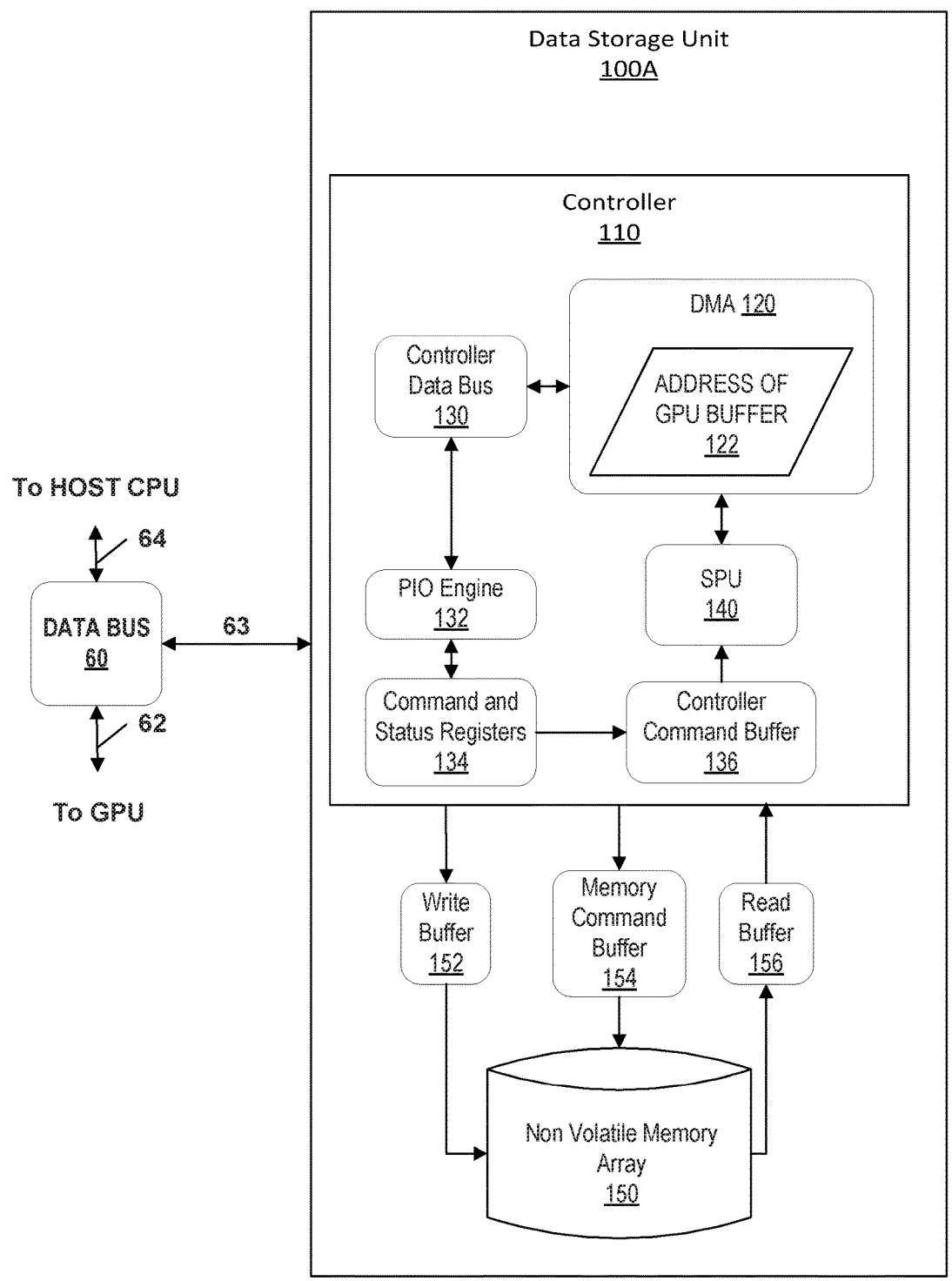
FIG. 2 is a conceptual diagram illustrating one example of the example data storage unit shown in FIG. 1, in accordance with techniques of this disclosure.

FIG. 2 is a conceptual diagram illustrating one example of data storage unit 100 shown in FIG. 1, in accordance with techniques of this disclosure. FIG. 2 is described below in the context of system 10 of FIG. 1.

In FIG. 2, data storage unit 100A includes non-volatile memory (NVM) array 150, write buffer 152, memory command buffer 154, read buffer 156 and controller 110. Controller 110 includes a controller data bus 130, programmed input/output (PIO) engine 132, registers for command and status 134, a controller command buffer 136 as well as direct memory address (DMA) engine 110 and synergistic processor unit (SPU) 140. As shown in the example of FIG. 2, DMA unit 120 includes memory location 122 which maintains an address of a GPU buffer associated with GPU 84. The components of controller 110 may perform operations described below using software, hardware, firmware, or a mixture of hardware, software, and firmware residing in and/or executing at controller 110. Controller 110 may execute PIO engine 132, SPU 140, and DMA 120 using one or multiple processors.

Controller110 may execute modules 132, 140, and 120 as a virtual machine executing on underlying hardware associated with storage unit 100A.

The addressable memory of data storage unit 100, in the example of FIG. 2 may be a non-volatile memory (NVM) array 150. NVM array 150 may receive commands from controller 110 through command buffer 154. Selected memory access commands may include a read data operation, a program operation and an erase operation and a write operation. To illustrate an example read operation, controller 110 may receive a request for a portion of data stored in NVM 150. This request for a portion of data could come from host CPU 80 or directly from GPU 84, in accordance with techniques of this disclosure. Controller 110 may determine the storage location from within NVM 150 and retrieve the portion of the data. NVM 150 may transfer data to data bus 60 through read buffer 156 as managed by controller 110. Data bus 60 may direct the portion of data to system memory 82 for use by host CPU 80, or to buffer 88, using the direct communication channel to GPU memory 86 for use by GPU 84. In some examples, read buffer 156 may allow data storage unit 100A to transfer data more quickly by pulling data from NVM 150 that data storage unit 100A anticipates host CPU 80 or GPU 84 may need.

Similarly, for an example write operation, GPU 84 may request to store information as a portion of data to data storage unit 100A. Controller 110 may determine a storage location for the portion of data and transfer the portion from buffer 88 using the direct communication channel. Data storage unit 100A may write the portion of data to NVM 150 through write buffer 152. Write buffer 152 may enable computing system 10 to operate more efficiently. For example, computing system 10 may be able to transfer a large portion of data to data storage unit 100A during periods when data bus 60 is less active with other tasks. Write buffer 152 may temporarily store data before writing to NVM 150 if NVM 150 is unable to store the data as fast as bus 60 transfers the data.

FIG. 2 depicts data storage unit 100A as being a solid state drive (SSD). However, data storage unit 100A may also be a hard disk drive (HDD), be configured as a redundant array of inexpensive/independent disks (RAID) that collectively function as a mass storage device, some combination of SSD and HDD, or other any other form of data storage device or data storage medium including non-transitory computer readable storage medium. An SSD that includes a fast NVM array may reduce the file input/output (I/O) delay compared to I/O delay on those data storage units based on rotating magnetic disks or flash memory. An SSD that includes an NVM array also may be able to exploit low latency and high bandwidth access, and may be able to read and write data faster than data bus 60 can transfer data.

Data storage unit 100A may contain a controller 110 that may include hardware and processing capability to offload some tasks from host CPU 80 or GPU 84, which may improve the efficiency of computing system 10. Controller 110 and data storage unit 100A are operatively and communicatively coupled via a data bus 60. In one example, controller 110 includes command and status registers 134 for communication with data bus 60. For example, when GPU 84 writes data to buffer 88 to be stored in data storage unit 100A, this may set a value in command and status registers 134. This value, or flag, may cause data storage unit 100A to transfer the data from buffer 88 and store in the addressable memory of data storage unit 100A, shown as NVM 150 in the example of FIG. 2.

Controller 110 may include data bus 130 that may manage the flow of commands and data within controller 110, similar to how data bus 60 manages data flow for system 10. Data bus 130 may work in combination with controller command buffer 136 to store and direct commands to other components of controller 110, until that component can execute the command. Controller 110 may also include a programmed input/output (PIO) engine 132 to manage some data transfer operations, thereby offloading some data transfer tasks from host CPU 80. For example, PIO 132 may handle command queuing and status notification such as monitoring the write data flag in command and status registers 134, discussed above.

Controller 110 may also include SPU 140 and DMA unit 120 (also referred to herein as DMA engine 120 and DMA 120), that in some examples, may also improve performance of computing system 10 by offloading functions from host CPU 80 and GPU 84, thereby freeing host CPU 80 and GPU 84 to perform other tasks. For direct memory access engine (DMA) 120 to directly transfer data from data storage unit 100A to another location, DMA 120 needs a "to address". This "to address" may be for a block of memory within system memory 82 or for a block of memory in GPU memory 86. In accordance with techniques of this disclosure, data storage unit 100A may receive information from host CPU 80 instructing the data storage unit 100A to perform direct communication with GPU 84. For example, host CPU 80 may command GPU 84 to reserve a block of memory in GPU memory 86, such as buffer 88, and transmit the address of buffer 88 to host CPU 80. Host CPU 80 may further transmit the address of buffer 88 to controller 110 of data storage unit 100A as part of the instruction to establish direct communication between GPU 84 and data storage unit 100A. The address of buffer 88 is an example of a "to address" described above.

Data storage unit 100A may initiate a direct communication channel with GPU 84 to perform direct communication with the GPU by registering the "to address" of buffer 88 to DMA 120, shown as address 122 in the example of FIG. 2. Note that DMA 120 may also register a "to address" for any one or more indications of memory locations for other components of computing system 10, such as a block of memory within system memory 82. Controller 110 may use the "to address" 122 in DMA 120 as being associated with GPU 84 for future information exchanges with GPU 84 using the direct communication channel, for example, the read operation and write operation described above.

When exchanging data, controller 110 may associate a logical address for data stored at NVM 150 with an actual, physical address within NVM 150. In the example read operation described above, controller 110 may receive a request for information at a logical address and in response, locate and retrieve the information at a corresponding physical address within NVM 150. More particularly, GPU 84 may request that a portion of data be stored at a particular logical location, and controller 110 may translate the logical location to a physical location within the memory space of NVM 150. Data storage unit 100A may transfer, using the direct communication channel, the portion of the data directly from data buffer 88 and to the physical storage location within the addressable memory of data storage unit 100A.

Within controller 110, synergistic processor unit (SPU) 140 may perform the function of determining one or more physical locations to store the data and transferring the data from data buffer 88 to the one or more locations within NVM array 150. Determining locations and transferring the data to the one or more locations within NVM 150 may be called a "scatter" operation. SPU 140 may perform both "scatter" and "gather" operations. For example, SPU 140 may perform a gather operation during the read operation, described above. SPU 140 may perform a gather operation when controller 110 receives a request for data from either GPU 84 or host CPU 80. SPU 140 may "gather" the portion data by determining the one or more locations of the portion and retrieving the portion of data from the one or more locations, based on the request. Controller 110, using DMA 120, may subsequently transfer this portion of data directly to the component of computing system 10 that requested the data. For example, where host CPU 80 sends the data request, controller 110 may transfer data directly to system memory 82. SPU 140 may improve performance of computing system 10 by offloading scatter-gather operations from host CPU 80 and from GPU 84. SPU 140 may also offload other data intensive tasks from host CPU 80, such as encryption and decryption.

A computing system that performs computationally intensive tasks on GPU 84, data-intensive tasks on SPU 140 and other system tasks on host CPU 80 may be called a cooperative computing system. For example, GPU 84 may perform a floating point sparse matrix multiplication operation that uses a large portion of data stored in many physical locations within NVM 150. SPU 140 may perform a gather operation as part of transferring the large portion data to buffer 88 using the direct communication channel. In response to receiving the portion of data, GPU 84 may perform the one or more functions associated with a floating point sparse matrix multiplication operation, and write the results of the functions to buffer 88. Writing to buffer 88 may trigger data storage unit 100A to transfer the results from buffer 88. SPU 140 may perform a scatter operation to write the results information to one or more physical locations within NVM 150. In this way, host CPU 80 may be available for other tasks because host CPU 80 offloaded the computationally intensive task to GPU 84 and the scatter-gather operation to SPU 140. Additionally, using the direct communication channel eliminated the need to for multiple data transfers for the same data. In other words, in this example, computing system 10 transferred the large portion of data a single time directly to buffer 88, instead of first to system memory 82, then a second transfer to GPU memory 86. This may both reduce latency when comparing two transfers to a single transfer as well as reduce data traffic on bus 60 because bus 60 need only mange one transfer of the same large portion of data instead of two transfers (data storage unit 100A to system memory 82 and subsequently to GPU memory 86).

Data storage unit 100A of FIG. 2 may interact with host CPU 80 and GPU 84 through data bus 60, in accordance with one or more techniques of this disclosure. In some examples of data storage unit 100A may include additional components not shown in FIG. 2 for ease of illustration. For example, data storage unit 100A may include power delivery components such as a capacitor, super capacitor, battery, or the like; a printed board (PB) to which at least some components of data storage unit 100A are mechanically attached and which includes electrically conductive traces that electrically interconnect components of storage unit 100. Other examples of data storage unit 100A may contain fewer components than shown in FIG. 2.

In some examples GPU 84 may execute one or more operations that rely on the direct communication channel to exchange second information directly with data storage unit 100. These operations include the read and write operations described above. In other examples, GPU 84 may perform one or more functions, such as bioinformatics, scientific computing, or data analytics described above. In response to performing the one or more functions, GPU 84 may determine the results of the one or more functions and transfer the results to buffer 88. In some examples, GPU 84 may send an indication that a portion of data is available for transfer from buffer 88 to data storage unit 100. GPU 84 may transfer to data storage unit 100, using the direct communication channel, and as part of a subsequent write operation performed between GPU 84 and data storage unit 100, information that includes the results of the one or more functions, to be stored as a second portion of the data stored at data storage unit 100.

Figure 3A:
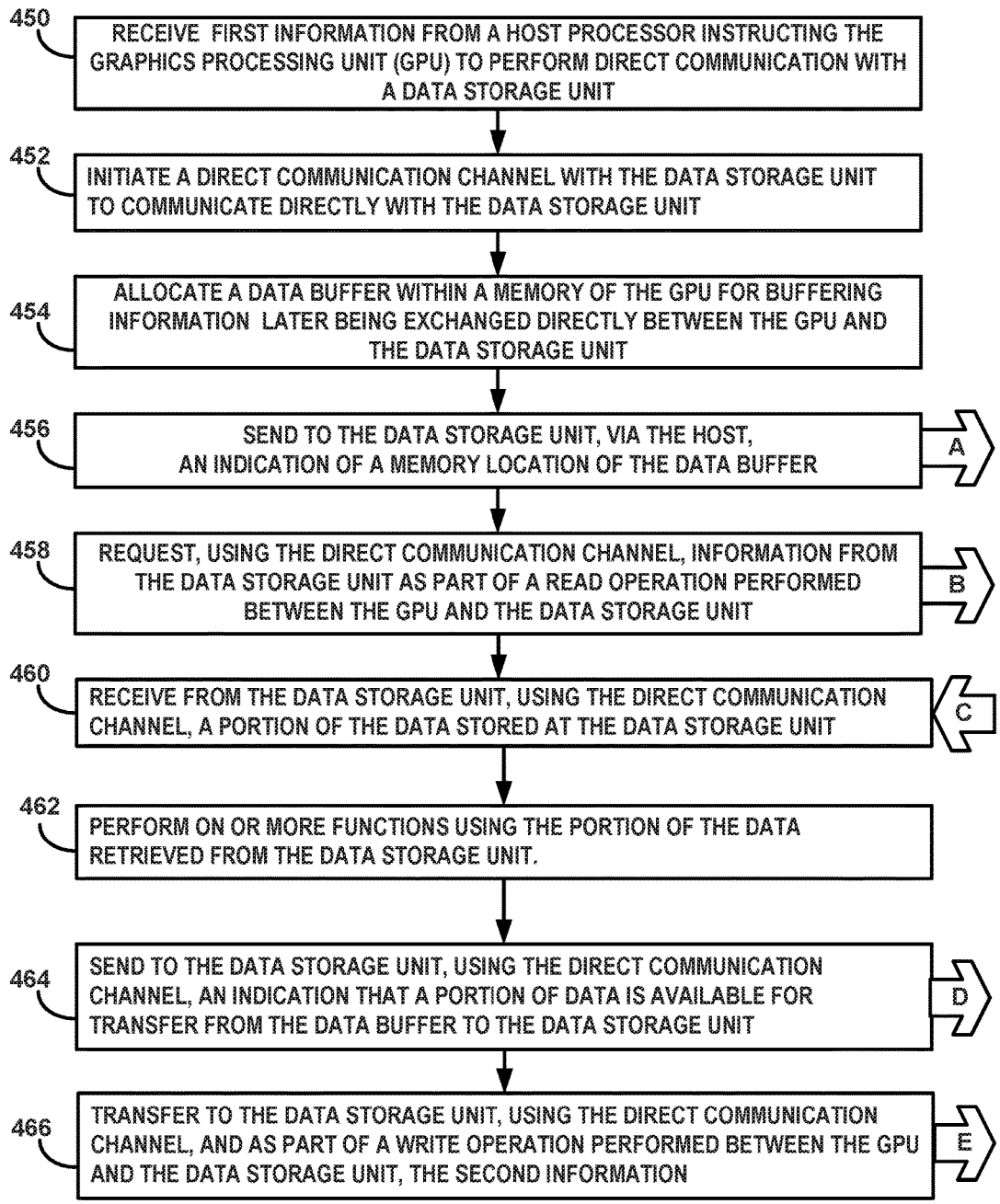
FIGS. 3A and 3B are flowcharts illustrating example operations performed by the example GPU and example data storage unit of FIG. 1, which are configured to communicate directly, in accordance with techniques of this disclosure.
Figure 3B:
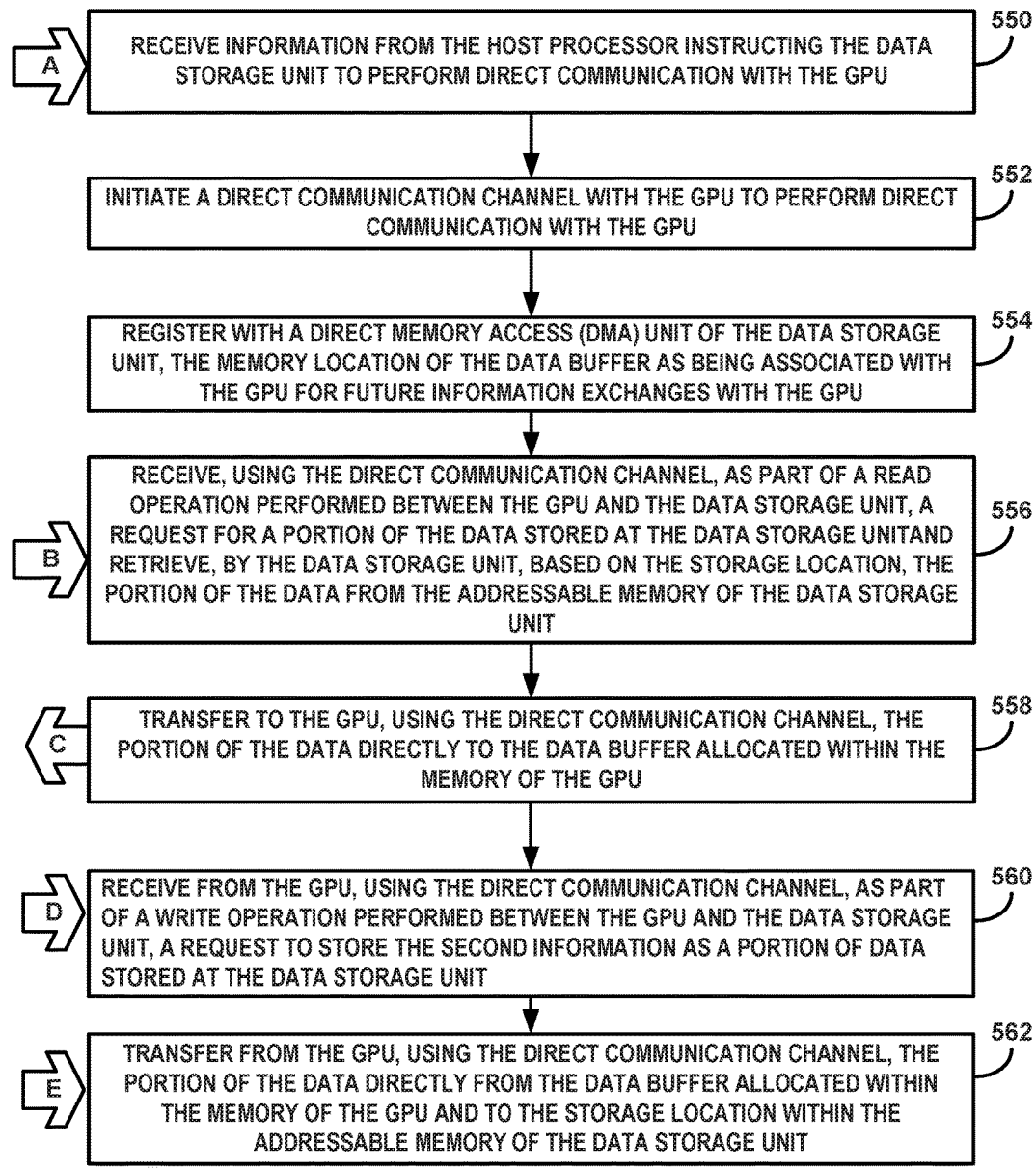

FIGS. 3A and 3B are flow diagrams illustrating example operations performed by components of the example GPGPU computing system. The operations of FIG. 3A may be performed by a GPU, such as GPU 84 of computing system 10 of computing system 10. Whereas, the operations of FIG. 3B may be performed by a data storage unit, such as data storage unit 100 of computing system 10. FIGS. 3A and 3B are described below in the context of computing system 10 of FIG. 1 and data storage unit 100A of FIG. 2.

Beginning with FIG. 3A, GPU 84 may receive first information from host CPU 80 instructing GPU 84 to perform direct communication with data storage unit 100 (450). For example, host CPU 80 may send a programming command to GPU 84 via data bus 60 through data path 68 that instructs GPU 84 to allocate a buffer within the GPU memory for use as a communication channel between GPU 84 and data storage unit 100.

In response to the instruction to perform direct communication, GPU 84 may initiate a direct communication channel with data storage unit 100 to communicate directly with data storage unit 100 (452). For example, GPU 84 may initiate the direct communication channel by exchanging various programming messages with CPU 80 as well as the control registers of data bus 60. Some example programming messages may include commands that push file handler information to the GPU allocate, reserve, or otherwise specify memory locations at the GPU and or system memory, etc.

As further part of the initiation of the direct communication channel, GPU 84 may allocate a data buffer within GPU memory for buffering information later being exchanged directly between GPU 84 and data storage unit 100 (454). Buffer 88 may include pinned memory with both upstream and downstream buffers for exchanging information with data storage unit 100. The pinned memory may have a logical and physical address that GPU 84 may provide to host CPU 80.

GPU may send to data storage unit 100, via host CPU 80, an indication of the address for the memory location of data buffer 88 within GPU memory 86 (456). For example, GPU 84 may provide CPU 80, via bus 60, with an address of the buffer that was allocated in response to the programming command. FIG. 3A depicts the indication of the address as outgoing information A being transmitted by GPU 84 which eventually is passed to data storage unit 100. In some examples, outgoing information A may consist, in part, of the logical address of buffer 88. In some examples, outgoing information A may travel through data bus 60 via data path 68, then be retransmitted by host CPU 80 through data path 66 to reach data storage unit 100.

Turning to FIG. 3B, data storage unit 100 performs similar operations as those performed up to this point by GPU 84 to initiate direct communication with GPU 84. Data storage unit 100 may receive information from host CPU 80 instructing data storage unit 100 to perform direct communication with GPU 84 (550). For example, data storage unit 100 may receive incoming information A which corresponds to outgoing information A from FIG. 3A. Incoming information A may include the address of the memory location of data buffer 88 allocated by GPU 84 for use as a direct communication channel. In some examples, the information may not contain the memory address information for buffer 88 and instead only contain programming commands instructing components of data storage unit 100 to prepare for direct communication.

Data storage unit 100 may initiate a direct communication channel with GPU 84 to perform direct communication with GPU 84 (552). For example, using the information received from CPU 80, a PIO engine of data storage unit 100 may initialize some registers and set up command queuing for use when directly communicating with GPU 84. Note that data path 66 between host CPU 80 and system memory 82 may still remain available for all data transfer operations that do not involve the GPU.

Data storage unit 100 may register, with DMA 120, the memory location of buffer 88 as being associated with GPU 84 for future information exchanges with GPU 84 (554). For example, data storage unit 100 may include a DMA, such as DMA 120 of FIG. 2, which may be able to directly transmit data from non-volatile memory of data storage unit 100 to data buffer 88. FIG. 1 depicts GPU memory 86 having a single data buffer 88. However, DMA 120 may register one or more address locations of one or more pinned memory locations for one or more data buffers. Each data buffer in GPU memory 86 may be associated with respective applications, threads, or services that are executing, in parallel, at GPU 84. Each data buffer may provide its own direct communication channel for communicating directly with data storage unit 100. In other words, GPU 84 and data storage unit 100 may share multiple independent communication channels, each communication channel being its own buffer in GPU memory 86. Each application, thread, or service that is executing at GPU 84 may be assigned to its own one or more communication channels, for communicating directly with data storage unit 100. In this way, a single application, thread, or service that is executing at GPU 84 may communicate directly with data storage unit 100 without interfering with the direct communication that may be occurring over other communication channels, between data storage unit 100 and the multiple other applications, threads, and/or services that are executing in parallel at GPU 84.

Returning to FIG. 3A, GPU 84 may request, using the direct communication channel, information from data storage unit 100 as part of a read operation performed between GPU 84 and data storage unit 100 (458). For example, in order for GPU 84 to perform certain operations on behalf of host CPU 80, GPU 84 may need to access certain information stored at data storage unit 100. Rather than rely on CPU 80 to retrieve the information stored at data storage unit 100, GPU 84 may retrieve the data directly using the communication channel established for direct communication. FIG. 3A depicts this data request as outgoing information B. GPU 84 may input a read request command message into the buffer that was allocated for direct communication, such that when data storage unit 100 identifies the read request command, data storage unit 100 recognizes the read request as being associated with GPU 84. As part of the read request, GPU 84 may include the location and size of the information stored at data storage unit 100 that GPU 84 wishes to read.

In FIG. 3B, data storage unit 100 may receive, using the direct communication channel, a request for a portion of the data stored at data storage unit 100 as part of a read operation performed between GPU 84 and data storage unit 100 and data storage unit 100A may retrieve, based on the storage location, the portion of data from the addressable memory of data storage unit 100 (556). FIG. 3B depicts the request as incoming information B which corresponds to outgoing information B from FIG. 3A. For example, in response to receiving incoming information B (e.g., in response to recognizing that a read command message was input by GPU 84 into the buffer), a SPU of data storage unit 100, such as SPU 140, may translate the read request. In translating the read request, the SPU may perform a gather operation by translating the location and size of the information indicated by the read request into one or more physical locations in the non-volatile memory of data storage unit 100.

Data storage unit 100 may transfer to GPU 84, using the direct communication channel, the portion of the data directly to buffer 88 (558). The SPU of data storage unit 100 may satisfy the read request by retrieving the data from the one or more physical locations and assemble the data as the portion of data requested by GPU 84. The SPU of data storage unit 100, in conjunction with the DMA engine of data storage unit 100, may transfer the data retrieved from non-volatile memory directly to data buffer 88 as outgoing information C.

In some examples, a controller of data storage unit 100, such as controller 110 of data storage unit 100A, may determine, based on the read request from GPU 84, the physical storage location of the portion of data waiting to be read from within the addressable memory. Once controller 110 retrieves the data from physical storage, such as in a gather operation described above, controller 110 may use DMA 120 to manage the transfer of the retrieved data to buffer 88. DMA 120 may transfer the retrieved data via data bus 60 through direct communication data path 69, as shown in FIG. 1.

Returning to FIG. 3A, GPU 84 may receive a portion of data stored at data storage unit 100, where the direct communication channel transfers the portion of data directly to buffer 88 from data storage unit 100 (460). FIG. 3A depicts this portion of data as incoming information C which corresponds to outgoing information C from FIG. 3B. In some examples, the portion of data may be too large to fit within data buffer 88 as a single transfer of information. In addition to the address of buffer 88, GPU 84 may also provide the size of buffer 88 to host CPU 80 to be further transferred to data storage unit 100. Data storage unit 100 may register the size of buffer 88, along with the address of buffer 88. In response to the request contained in information B (described above) data storage unit 100 may determine the amount of data that will make up the portion of data. If the portion of data is too large to fit within data buffer 88 during a single transfer, data storage unit 100, data bus 60, or some other component of computing system 10 may break this data into smaller sub-portions and transfer each sub-portion to data buffer 88 as multiple consecutive transfers. GPU 84 may move each sub-portion out of data buffer 88 and assemble the first portion at a different location within GPU memory 86.

As described above, GPU 84 may perform one or more function using the portion of the data retrieved from the data storage unit (462). For example, even though GPU 84 may primarily perform graphics processing on behalf of CPU 80, GPU 84 may at times execute operations that may be unrelated to graphics processing. For instance, GPU 84 may execute complex and sometimes repetitive computations on the data or information stored at data storage unit 100 on behalf of host CPU 80. On behalf of CPU 80, GPU 84 may execute, one or more applications, services, and/or threads that would otherwise execute at CPU 80, which rely on the information stored at data storage 100. GPU 84 may determine one or more results and write the results to buffer 88 for subsequent storage at data storage 100.

As part of a write operation performed between GPU 84 and data storage unit 100, GPU 84 may send an indication to data storage unit 100 that a portion of data is available for transfer from buffer 88 to data storage unit 100, as discussed above (464). FIG. 3A depicts this indication as outgoing information D. For example, this indication may come from the process of writing results of one or more functions to buffer 88. In other examples, GPU 84 may send a notification, via host CPU 80 or directly to data storage unit 100 that data is available for transfer by including a write request command within data buffer 88.

With reference to FIG. 3B, data storage unit 100 may receive from GPU 84, using the direct communication channel, as part of a write operation performed between GPU 84 and data storage unit 100, a request to store second information as a portion of data stored at data storage unit 100 (560). FIG. 3B depicts this indication as incoming information D which corresponds to outgoing information D from FIG. 3A. For example, data storage unit 100A may receive a request to information determined from an operation performed by GPU 84 at a logical address of data storage unit 100. An SPU of data storage unit 100 may translate the logical addresses into physical addresses within the addressable memory of data storage unit 100A.

Turning back to FIG. 3A, GPU 84 may transfer to data storage unit 100, using the direct communication channel, and as part of a write operation performed between GPU 84 and data storage unit 100, the second information to be stored in data storage unit 100 (466). FIG. 3A depicts this transfer as outgoing information E. For example, GPU 84 may input the outgoing information E into buffer 88, and cause buffer 88 to transfer the portion of data to data storage unit 100 as part of a dedicated data path between GPU 84 and data storage unit 100 that bypasses host CPU 80 and system memory 82.

With reference to FIG. 3B, data storage unit 100 may transfer from GPU 84, using the direct communication channel, the portion of the data directly from data buffer 88 allocated within GPU memory 86 and to the storage location within the addressable memory of data storage unit 100 (562). FIG. 3B depicts this data transfer as incoming information E which corresponds to outgoing information E from FIG. 3A. For example, GPU 84 may transfer the portion of the data directly from buffer 88 and to the storage location within the addressable memory of data storage unit 100. In some examples, a SPU and/or a DMA of a controller of data storage unit 100 may translate the logical address for the portion of data into a physical address within a non-volatile memory of data storage unit 100. Such an SPU or controller may perform a scatter operation by determining one or more physical storage locations for the portion of data and then write the portion of data to the one or more locations within the non-volatile memory.

In this way, the techniques of this disclosure may enable direct communication between GPU and a data storage unit of an example GPGPU system without involving a host processor or a system memory of the GPGPU system. After initialization, the GPU may read and write information to a data buffer, as if the GPU was reading and writing directly to the data storage unit and the data storage unit may automatically recognizes when the GPU reads or writes to the data buffer, and in response, perform a corresponding operation on its stored data. Accordingly the GPU can perform operations on behalf of the host as part of GPGPU techniques that rely on information stored at the data storage unit without impacting performance of the GPGPU system. In other words, the GPU can execute more types of applications, threads, or services than other types of GPGPU systems since, with direct access to information stored at a data storage unit, the GPU can perform operations on the stored data, and do more than merely computational intensive tasks that do not rely on information stored at the data storage unit.

Clause 1: A method comprising: receiving, by a graphics processing unit (GPU) of a computing system, from a host processor of the computing system, first information instructing the GPU to perform direct communication with a data storage unit of the computing system; responsive to receiving the first information, initiating, by the GPU, a direct communication channel with the data storage unit to communicate directly with the data storage unit; and executing, by the GPU, one or more operations that rely on the direct communication channel to exchange second information directly with the data storage unit.

Clause 2: The method of clause 1, wherein executing the one or more operations comprises at least one of: requesting, by the GPU, from the data storage unit, using the direct communication channel, and as part of a read operation performed between the GPU and the data storage unit, the second information; or transferring, from the GPU, to the data storage unit, using the direct communication channel, and as part of a write operation performed between the GPU and the data storage unit, the second information, wherein the second information comprises a portion of data stored at the data storage unit.

Clause 3: The method of clause 2, wherein executing the one or more operations further comprises: responsive to requesting the second information, receiving, by the GPU, from the data storage unit, using the direct communication channel, the portion of the data stored at the data storage unit; and performing, by the GPU, using the portion of the data, one or more functions.

Clause 4: The method of clause 3, wherein the portion of the data stored at the data storage unit is a first portion of data and executing the one or more operations further comprises: determining, by the GPU, third information in response to performing the one or more functions; and transferring, from the GPU, to the data storage unit, using the direct communication channel, and as part of a subsequent write operation performed between the GPU and the data storage unit, the third information to be stored as a second portion of the data stored at the data storage unit.

Clause 5: The method of any of clauses 1-4, wherein initiating the direct communication channel with the data storage unit comprises: allocating, by the GPU, a data buffer within a memory of the GPU for buffering portions of the second information during an exchange between the GPU and the data storage unit; and sending, from the GPU, to the data storage unit, via the host, an indication of a memory location of the data buffer.

Clause 6: The method of clause 5, wherein the direct communication channel comprises the data buffer within the memory of the GPU to be used as a dedicated data path between the GPU and the data storage unit that bypasses the host CPU and system memory.

Clause 7: A method comprising: receiving, by a solid state drive (SSD) of a computing system, from a host processor of a computing system, first information for instructing the SSD to perform direct communication with a graphics processing unit (GPU) of the computing system; initiating, by the SSD, based on the first information, a direct communication channel with the GPU to perform direct communication with the GPU; and exchanging, by the SSD, using the direct communication channel, second information with the GPU.

Clause 8: The method of clause 7, wherein: the first information includes an indication of a memory location of a data buffer allocated within a memory of the GPU; the data buffer is reserved by the GPU for exchanging, directly with the SSD, data stored at the SSD; and initiating the direct communication channel with the GPU comprises registering, by the SSD, with a direct memory access (DMA) unit of the SSD, the memory location of the data buffer as being associated with the GPU for future information exchanges with the GPU.

Clause 9: The method of clause 8 further comprising: receiving, by the SSD, from the GPU, using the direct communication channel, as part of a read operation performed between the GPU and the SSD, a request for a portion of the data stored at the SSD; determining, by the SSD, based on the request, a storage location of the portion of the data from within addressable memory of the SSD; retrieving, by the SSD, based on the storage location, the portion of the data from the addressable memory of the SSD; transferring, by the SSD, to the GPU, using the direct communication channel, the portion of the data directly to the data buffer allocated within the memory of the GPU.

Clause 10: The method of any of clauses 8-9 further comprising: receiving, by the SSD, from the GPU, using the direct communication channel, as part of a write operation performed between the GPU and the SSD, a request to store the second information as a portion of data stored at the SSD; determining, by the SSD, based on the request, a storage location for the portion of the data within addressable memory of the SSD; transferring, by the SSD, from the GPU, using the direct communication channel, the portion of the data directly from the data buffer allocated within the memory of the GPU and to the storage location within the addressable memory of the SSD.

Clause 11: A computing system, comprising: a data bus; a host processor communicatively coupled to the data bus; a graphics processing unit (GPU) communicatively coupled to the data bus; and a data storage unit communicatively coupled to the data bus, wherein: the data storage unit is configured to store data, and the GPU is configured to: receive, via the data bus, from the host processor, first information instructing the GPU to perform direct communication, over the data bus, with the data storage unit; responsive to receiving the first information, initiate a direct communication channel, over the data bus, with the data storage unit to communicate directly with the data storage unit; and execute one or more operations that rely on the direct communication channel to exchange second information directly with the data storage unit.

Clause 12: The computing system of clause 11, wherein the data storage unit is further configured to: receive, via the data bus, from the host processor, third information instructing the data storage unit to perform direct communication with the GPU; initiate, based on the third information, the direct communication channel, over the data bus, to perform direct communication with the GPU; and exchange, using the direct communication channel over the data bus, the second information directly with the GPU.

Clause 13: The system of clause 12, wherein: the GPU is configured to initiate the direct communication channel by: allocating a data buffer within a memory of the GPU for buffering portions of the second information during an exchange between the GPU and the data storage unit; and sending, to the data storage unit, via the host, an indication of a memory location of the data buffer; and the data storage unit is further configured to initiate the direct communication channel by: receiving, from the GPU, via the host, based on the third information, an indication of the memory location of the data buffer; registering the memory location as being associated with the GPU for future information exchanges with the GPU.

Clause 14: The system of clause 13, wherein the data storage unit comprises a direct memory access (DMA) unit configured to register the memory location as being associated with the GPU for future information exchanges with the GPU.

Clause 15: The system of any of clauses 13-14, wherein: the direct communication channel comprises the data buffer within the memory of the GPU to be used as a dedicated data path of the data bus between the GPU and the data storage unit, and the dedicated data path bypasses the host CPU and system memory.

Clause 16: The system of any of clauses 11-15, wherein the GPU is further configured to execute the one or more operations by: requesting, from the data storage unit, using the direct communication channel, and as part of a read operation performed between the GPU and the data storage unit, the second information; receiving, from the data storage unit, using the direct communication channel, as the second information, a first portion of the data stored at the data storage unit; performing, using the first portion of the data, one or more functions; determining third results information in response to performing the one or more functions; and transferring, to the data storage unit, using the direct communication channel, and as part of a subsequent write operation performed between the GPU and the data storage unit, the third results information to be stored as a second portion of the data stored at the data storage unit.

Clause 17: The system of clause 16 wherein the data storage unit is further configured to: receive, from the GPU, using the direct communication channel, as part of the read operation performed between the GPU and the data storage unit, the second information; retrieve, based on the second information and using a controller of the data storage unit, the first portion of the data by at least: determining, based on the second information, a storage location of the first portion of the data, and transfer, using the direct communication channel, the first portion of the data directly to a data buffer allocated within a memory of the GPU.

Clause 18: The system of clause 17, wherein the controller comprises a synergistic processing unit (SPU).

Clause 19: The system of any of clauses claim 11-18, wherein the data storage unit is a solid state drive (SSD).

Clause 20: The system of any of clauses 11-19, wherein the system comprises a single computing device.

Various embodiments of the invention have been described. These and other embodiments are within the scope of the following claims.

The invention claimed is:

1. A method comprising:
    receiving at a data storage unit, by a graphics processing unit (GPU) of a computing system, from a host processor of the computing system, first information instructing the GPU to perform direct communication with the data storage unit of the computing system wherein the data storage unit has controller with a synergistic processing unit to perform scatter and gather operations, encryption, decryption and direct memory access operations originating from the data storage unit;
    responsive to receiving the first information, initiating, by the GPU, a direct communication channel, bypassing the host processor and system memory, with the data storage unit, and allocating a data buffer within a GPU memory to buffer positions of a second information during an exchange between the GPU and the data storage unit, and send an indication of a memory location of the data buffer; and
    executing, by the GPU, one or more operations that rely on the direct communication channel to exchange the second information directly with the data storage unit, wherein the data storage unit is configured to interface with the GPU through a GPU-data storage unit interface and through the host processor, wherein the data are configured to be transferred through the data buffer of the GPU memory and the data storage unit without using the host processor.

2. The method of claim 1, wherein executing the one or more operations comprises at least one of:
    requesting, by the GPU, from the data storage unit, using the direct communication channel, and as part of a read operation performed between the GPU and the data storage unit, the second information; or
    transferring, from the GPU, to the data storage unit, using the direct communication channel, and as part of a write operation performed between the GPU and the data storage unit, the second information, wherein the second information comprises a portion of data stored at the data storage unit.

3. The method of claim 2, wherein executing the one or more operations further comprises:
    responsive to requesting the second information, receiving, by the GPU, from the data storage unit, using the direct communication channel, the portion of the data stored at the data storage unit; and
    performing, by the GPU, using the portion of the data, one or more functions.

4. The method of claim 3, wherein the portion of the data stored at the data storage unit is a first portion of data and executing the one or more operations further comprises:
    determining, by the GPU, third information in response to performing the one or more functions; and
    transferring, from the GPU, to the data storage unit, using the direct communication channel, and as part of a subsequent write operation performed between the GPU and the data storage unit, the third information to be stored as a second portion of the data stored at the data storage unit.

5. A method comprising:
    receiving, by a solid state drive (SSD) of a computing system, from a host processor of a computing system, first information instructing the SSD to perform direct communication with a graphics processing unit (GPU) of the computing system, wherein the first information includes an indication of a memory location of a data buffer allocated within a GPU memory that is reserved by the GPU for directly exchanging data with the SSD, wherein the solid state drive has a controller with a synergistic processing unit configured to perform encryption, decryption and direct memory access operations originating from the SSD;
    initiating, by the SSD, based on the first information, a direct communication channel with the GPU to perform direct communication between the GPU and the SSD that bypasses the host processor and system memory, wherein the initiating further comprises: registering, by the SSD, with a direct memory access (DMA) unit of the SSD, the memory location of the data buffer associated with the GPU for future information exchanges with the GPU; and
    exchanging, by the SSD, using the direct communication channel, second information with the GPU, wherein the SSD is configured to interface with the GPU through a GPU-SSD interface and the host processor, wherein the data are configured to be transferred through the buffer of the GPU memory and the SSD without using the host processor.

6. The method of claim 5 further comprising:
    receiving, by the SSD, from the GPU, using the direct communication channel, as part of a write operation performed between the GPU and the SSD, a request to store the second information as a portion of data stored at the SSD;
    determining, by the SSD, based on the request, a storage location for the portion of the data within addressable memory of the SSD;
    transferring, by the SSD, from the GPU, using the direct communication channel, the portion of the data directly from the data buffer allocated within the memory of the GPU and to the storage location within the addressable memory of the SSD.

7. A computing system, comprising:
    a data bus;
    a host processor communicatively coupled to the data bus;
    a graphics processing unit (GPU) communicatively coupled to the data bus; and
    a data storage unit communicatively coupled to the data bus, wherein:
    the data storage unit is configured to store data with a controller with a synergistic processor unit configured to perform scatter and gather operations, encryption, decryption and direct memory access operations originating from the data storage unit; and
    the GPU is configured to:

receive, via the data bus, from the host processor, first information instructing the GPU to perform direct communication, over the data bus, with the data storage unit;

responsive to receiving the first information, initiate a direct communication channel, over the data bus, with the data storage unit to communicate directly with the data storage unit as a dedicated data path of the data bus between the GPU and the data storage unit that bypasses the host processor and system memory; and execute one or more operations that rely on the direct communication channel to exchange second information directly with the data storage unit, wherein the data storage unit is configured to interface with the GPU through a GPU-data storage interface and the host processor, wherein the data are configured to be transferred through a buffer of a GPU memory and the data storage unit without using the host processor and the data storage unit is configured to perform direct memory access operations;

wherein the GPU is configured to initiate the direct communication channel by:

allocating the buffer of the GPU memory for buffering portions of the second information during an exchange between the GPU and the data storage unit; and sending, the data storage unit, via the host processor, an indication of a memory location of the buffer.

8. The system of claim 7, wherein the data storage unit comprises a direct memory access (DMA) unit configured to register the memory location as being associated with the GPU for future information exchanges with the GPU.

9. The system of claim 7, wherein the GPU is further configured to execute the one or more operations by:

requesting, from the data storage unit, using the direct communication channel, and as part of a read operation performed between the GPU and the data storage unit, the second information;

receiving, from the data storage unit, using the direct communication channel, as the second information, a first portion of the data stored at the data storage unit;

performing, using the first portion of the data, one or more functions;

determining results information in response to performing the one or more functions; and transferring, to the data storage unit, using the direct communication channel, and as part of a subsequent write operation performed between the GPU and the data storage unit, the results information to be stored as a second portion of the data stored at the data storage unit.

10. The system of claim 9 wherein the data storage unit is further configured to:

receive, from the GPU, using the direct communication channel, as part of the read operation performed between the GPU and the data storage unit, the second information;

retrieve, based on the second information and using the controller of the data storage unit, the first portion of the data by at least:

determining, based on the second information, a storage location of the first portion of the data; and transfer, using the direct communication channel, the first portion of the data directly to a data buffer allocated within a memory of the GPU.

11. The system of claim 7, wherein the data storage unit is a solid state drive (SSD).

12. The system of claim 7, wherein the system comprises a single computing device.

13. A computing system, comprising:

a data bus;

a host processor communicatively coupled to the data bus;

a graphics processing unit (GPU) communicatively coupled to the data bus; and a data storage unit communicatively coupled to the data bus, wherein:

the data storage unit is configured to store data with a controller with a synergistic processor unit configured to perform scatter and gather operations, encryption, decryption and direct memory access operations originating from the data storage unit; and the GPU is configured to:

receive, via the data bus, from the host processor, first information instructing the GPU to perform direct communication, over the data bus, with the data storage unit;

responsive to receiving the first information, initiate a direct communication channel, over the data bus, with the data storage unit to communicate directly with the data storage unit as a dedicated data path of the data bus between the GPU and the data storage unit that bypasses the host processor and system memory; and execute one or more operations that rely on the direct communication channel to exchange second information directly with the data storage unit, wherein the data storage unit is configured to interface with the GPU through a GPU-data storage interface and through the host processor, wherein the data is configured to be transferred through a buffer of a GPU memory and the data storage unit without using the host processor and the data storage unit is configured to perform direct memory access operations;

wherein the data storage unit is configured to initiate the direct communication channel by:

receiving, from the GPU, via the host processor, based on a third information, an indication of a location of the buffer of the GPU memory; and registering the buffer location as being associated with the GPU for future information exchanges with the GPU.

* * * * *